(12) United States Patent
Ikebe et al.

(10) Patent No.: US 6,266,319 B1
(45) Date of Patent: *Jul. 24, 2001

(54) DISC CARTRIDGE INTEGRALLY FORMED OF TRANSPARENT AND NON-TRANSPARENT RESIN, AND MOLDING DIE THEREFOR

(75) Inventors: Masaru Ikebe; Yukio Miyazaki; Akio Momoi, all of Saku (JP)

(73) Assignee: TDK Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/665,464

(22) Filed: Jun. 18, 1996

(30) Foreign Application Priority Data

Jun. 20, 1995 (JP) .................................................. 7-175623

(51) Int. Cl.$^7$ .......................... G11B 23/03; G11B 23/113
(52) U.S. Cl. ............................................. 369/291; 360/133
(58) Field of Search ................................. 360/132, 133; 369/291

(56) References Cited

U.S. PATENT DOCUMENTS 5,101,307 * 3/1992 Mizuno et al. ...................... 360/132

FOREIGN PATENT DOCUMENTS

| 3-162787 | 7/1991 | (JP) . |
| 5-325494 | 12/1993 | (JP) . |
| 6-52064 | 7/1994 | (JP) . |
| 3013199 | 4/1995 | (JP) . |

* cited by examiner

*Primary Examiner*—David L. Ometz
(74) *Attorney, Agent, or Firm*—Lerner, David, Littenberg, Krumholz & Mentlik, LLP (57) ABSTRACT

A disc cartridge capable of improving an appearance of a casing and quality thereof and a molding die capable of providing such an improved disc cartridge. A casing is provided at a peripheral portion thereof other than a disc receiving section opposite to a disc-like medium with a two-layer section constructed of a non-transparent resin layer and a transparent resin layer laminated on each other in a direction of thickness of the casing. A molding die including a fixed part and a movable part is so constructed that a slide mold for molding a transparent resin section and the transparent resin layer of the two-layer section is arranged in the fixed part.

36 Claims, 6 Drawing Sheets

DISC CARTRIDGE INTEGRALLY FORMED OF TRANSPARENT AND NON-TRANSPARENT RESIN, AND MOLDING DIE THEREFOR

BACKGROUND OF THE INVENTION

This invention relates to a disc cartridge and a molding die therefor, and more particularly to a disc cartridge having a disc-like medium such as an optical disc, a magneto-optical disc or the like rotatably received therein and a molding die therefor.

In general, an information medium or a disc-like medium such as, for example, a magnetic disc, an optical disc, a magneto-optical disc or the like is used in the form of a disc cartridge while being received in a casing. Conventional casings for such a disc cartridge include a casing made of one kind of transparent or non-transparent resin and a casing integrally made of both transparent resin and non-transparent resin. Such a transparent disc cartridge is disclosed in Japanese Patent Application Laid-Open Publication No. 325494/1993 and Japanese Utility Model Application Laid-Open Publication No. 52064/1994 and such a non-transparent disc cartridge is conventionally used for a micro floppy disc (MFD). The assignee proposed a disc cartridge integrally formed of both non-transparent resin and transparent resin, as disclosed in Japanese Utility Model Application No. 17002/1994 and Japanese Patent Application No. 337509/1994.

Of the above-described conventional casings for the disc cartridge, the casing made of one kind of non-transparent resin or transparent or semitransparent resin is monotonous in design. This is remarkable particularly when it is made of non-transparent resin. Thus, it is difficult for a user to distinguish between non-transparent disc cartridges manufactured by different manufacturers. Also, the conventional casing made of transparent resin causes an internal structure of the disc cartridge to be observed from outside, therefore, it is required to design the disc cartridge while taking a serious view of an appearance thereof. Unfortunately, this renders manufacturing of the cartridge highly troublesome and increases a manufacturing cost thereof.

The casing integrally made of both non-transparent resin and transparent resin causes a joining surface between the non-transparent resin and the transparent resin to be disadvantageously reduced in thickness because the casing generally has a thickness as small as about 1 mm. In order to provide joining strength of a sufficient level, it is required to carry out charging of two kinds of resins prior to solidification of the resins. This requires to increase both a resin temperature and a die temperature to an increase level, leading to a deterioration in workability and a failure in molding called burns.

Also, a conventional molding die for forming conventional non-transparent resin and transparent resin into a casing is so constructed that a slide mold is arranged in a movable part of the molding die in a manner to be closely contacted with a surface of the die opposite thereto, to thereby prevent the non-transparent resin from mixedly entering a portion of the casing made of the transparent resin. The non-transparent resin is first charged in the die thus constructed, resulting in a peripheral body of a casing being formed. Then, the slide mold is retreated to form a space in the die, which is charged with the transparent resin to form a transparent window. In a conventional tape cassette, a casing is often constructed in such a manner that non-transparent resin and transparent or semitransparent resin are integrally molded into two-layer structure having a non-transparent resin layer and a transparent or semitransparent resin layer laminated on each other in a direction of thickness of the casing. In the tape cassette thus constructed, the casing has a thickness of about 1.8 mm and a sheet material of PET is interposed between a tape-like medium received therein and an inner surface of the casing, so that the casing exhibits joining strength of an enough level even if it is not formed into the two-layer structure and a joining surface is provided only in the direction of thickness of the casing. Also, the sheet effectively prevents any bur possibly formed on the casing from adversely affecting the tape-like medium. Whereas, in the conventional disc cartridge, the transparent window of the casing is generally arranged so as to be opposite to a disc-like medium and a boundary between the slide mold and the movable part causes a bur to be formed on the transparent window of the casing. Unfortunately, the bur contacts with the disc-like medium to damage a recording and reproducing surface of the medium due to lack of any sheet therebetween.

SUMMARY OF THE INVENTION

The present invention has been made in view of the foregoing disadvantages of the prior art.

Accordingly, it is an object of the present invention to provide a disc cartridge which is capable of improving an appearance of the disc cartridge and quality thereof.

It is another object of the present invention to provide a disc cartridge which is capable of significantly improving moldability of a casing integrally made of both non-transparent resin and transparent or semitransparent resin.

It is a further object of the present invention to provide a disc cartridge which is capable of providing a casing with increased strength and increasing reliability thereof.

It is still another object of the present invention to provide a molding die which is capable of satisfactorily providing a disc cartridge exhibiting such advantages as described above.

In accordance with one aspect of the present invention, a disc cartridge is provided. The disc cartridge includes a casing of a substantially rectangular shape formed with at least one opening through which a drive and/or operation element of a recording and reproducing unit is withdrawably inserted into the casing. The casing is integrally formed of non-transparent resin and transparent or semitransparent resin. The casing is formed therein with a disc receiving section in which a disc-like medium is rotatably received. The casing is provided at a peripheral area thereof other than the disc receiving section opposite to the disc-like medium with a two-layer section constructed of a non-transparent resin layer and a transparent or semitransparent resin layer laminated on each other in a direction of thickness of the casing.

In a preferred embodiment of the present invention, the disc receiving section of the casing has a transparent window formed of transparent or semitransparent resin. The transparent window is formed so as to be contiguous to said two-layer section.

In a preferred embodiment of the present invention, the disc receiving section is formed without leaving a parting line of a casing molding die thereon.

In a preferred embodiment of the present invention, the non-transparent resin layer of the two-layer section is arranged on a side of an inner surface of the casing and the transparent or semitransparent resin layer thereof is arranged on a side of an outer surface of the casing.

In accordance with another aspect of the present invention, a molding die for a disc cartridge is provided. The molding die includes a fixed part and a movable part for integrally molding non-transparent resin and transparent or semitransparent resin into a casing for a disc cartridge. The casing includes a transparent resin section and a two-layer section consisting of at least a transparent resin layer. The molding die also includes a slide mold for molding the transparent resin section and the transparent resin layer of the two-layer section. The slid mold is arranged in the fixed part.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described hereinafter with reference to the accompanying drawings.

Referring first to FIGS. 1 to 6C, an embodiment of each of a disc cartridge and a molding die for forming of the disc cartridge according to the present invention is illustrated. A disc cartridge of the illustrated embodiment includes a casing constructed of an upper casing member 1 and a lower casing member 2 joined to each other so as to define a space or a disc receiving section 28 therein. The disc receiving section 28 of the casing thus formed is adapted to rotatably receive therein a disc-like medium 10 for recording and reproducing information. In the illustrated embodiment, the disc receiving section 28 is provided with a transparent window 6. The casing is formed with at least one opening 3 through which a head of a recording and reproducing unit or the like is inserted into the casing. The disc cartridge also includes a shutter 4 of a substantially U-shape which is slidably fitted on the casing so that it selectively opens or closes the opening 3. For this purpose, the casing is formed on an outer surface thereof with a shutter slide area 5 in a manner to be recessed from a level of the outer surface thereof and the shutter 4 is fitted on the shutter slide area 5 so as to be slidable thereon. Further, the disc cartridge of the illustrated embodiment includes a shutter lock member 23, which functions to lock the shutter 4 to keep it from accidentally or inadvertently opening when it is kept closed. Also, the disc cartridge includes a miserasure inhibiting member 22 through which recording permission or impermission is selected as desired.

Figure 1:
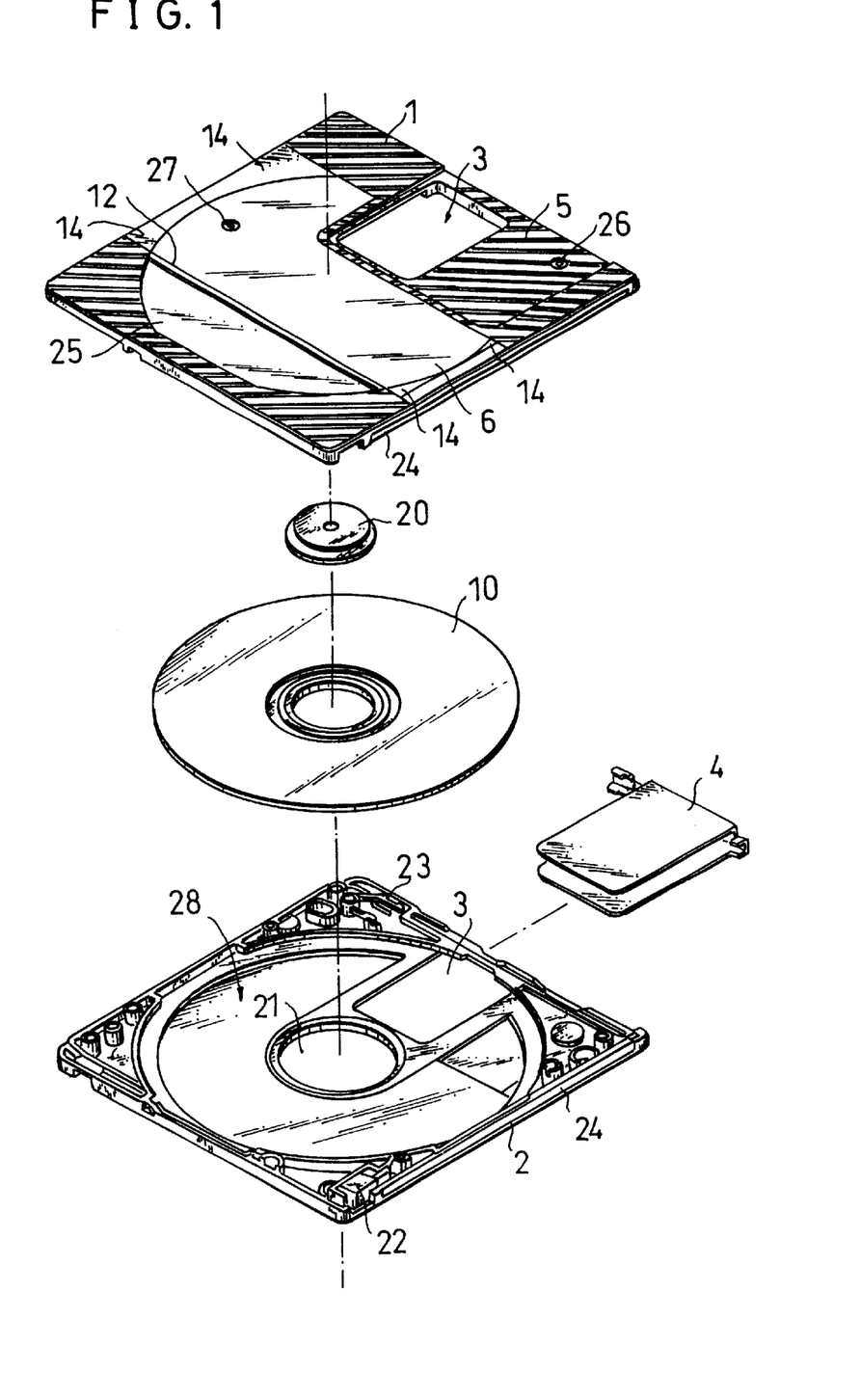
FIG. 1 is an exploded perspective view showing an embodiment of a disc cartridge according to the present invention.
Figure 2A:
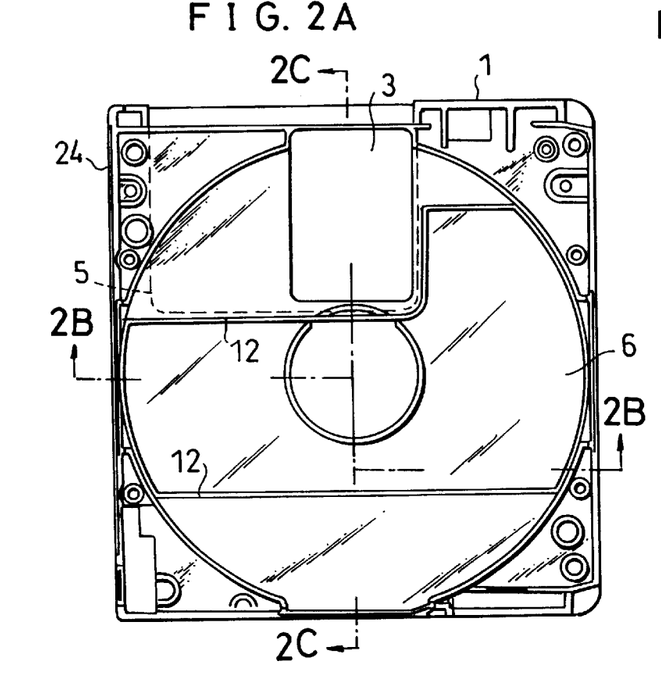
FIG. 2A is a bottom view showing an inner structure of an upper casing member of a casing for the disc cartridge of FIG. 1.

Furthermore, the disc cartridge of the illustrated embodiment is so constructed that the upper casing member 1 is provided at a peripheral portion thereof other than the disc receiving section 28 opposite to the disc-like medium 10 with a two-layer section 14 constructed of a non-transparent resin layer and a transparent or semitransparent resin layer laminated on each other in a direction of thickness of the upper casing member 1.

The two-layer section 14 is preferably formed in a manner to be contiguous to the transparent window 6 of the disc receiving section 28, because such formation of the two-layer section 14 permits a slide mold used as a part of a molding die to be simplified in configuration, resulting in reliability and formability of the casing being highly enhanced. An outer layer of the two-layer section 14 defined on an outer surface side of the casing is preferably formed of a transparent resin, because this prevents any burr due to an interstice at a parting line of a molding die from being undesirably formed on the disc receiving section 28. Also, this permits the casing to have an appearance improved or varied due to a combination of three sections or a non-transparent section, a transparent section and the above-described two-layer section constructed of the non-transparent resin layer and transparent resin layer laminated on the non-transparent resin layer.

Figure 3:
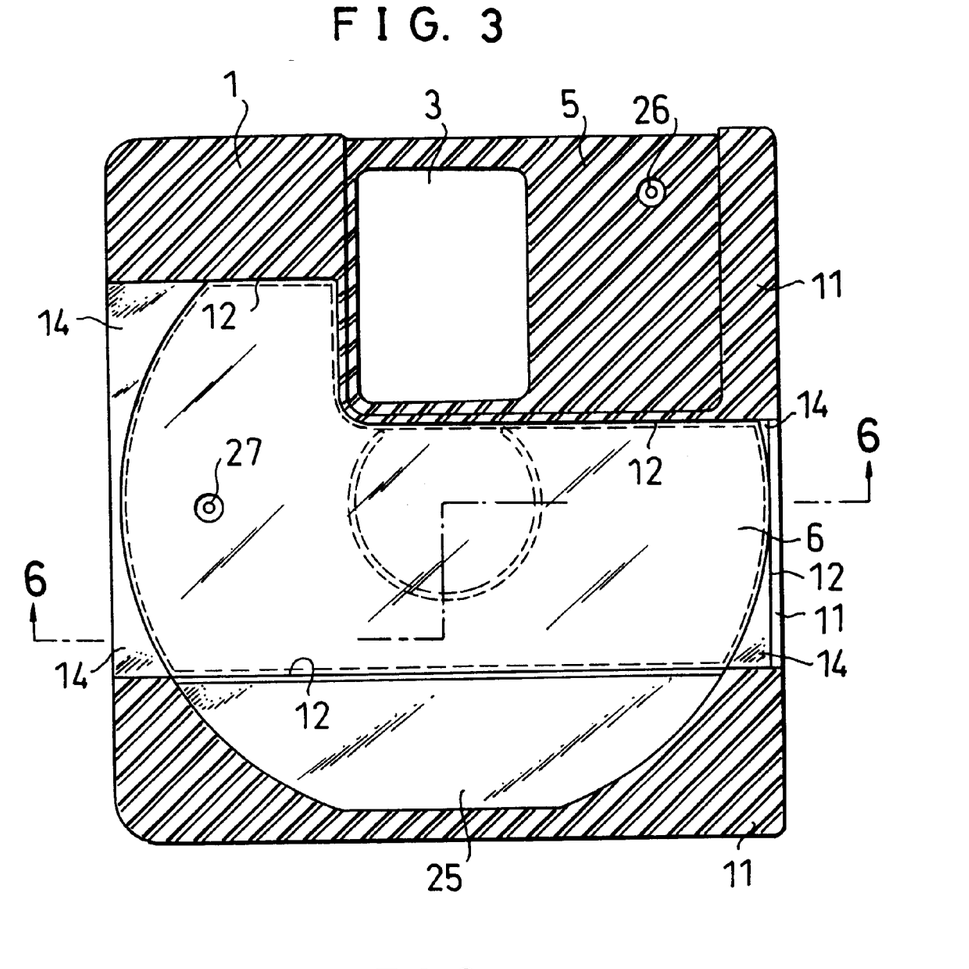
FIG. 3 is a plan view showing an outer structure of the upper casing member shown in FIG. 2A.

More particularly, the upper casing member 1 includes a non-transparent resin section 11 made of non-transparent resin and constituting a main portion of the upper casing member 1 including a peripheral area or portion of the upper casing member 1 and the transparent window 6 made of transparent resin and arranged opposite to a recording surface of the disc-like medium 10. Also, the upper casing member 1 includes the above-described two-layer section 14 arranged outside of the transparent window 6 and constructed of the non-transparent resin layer constituting a lower layer and the transparent resin layer constituting an upper layer. The transparent window 6 is formed with the same maximum diameter as a diameter of the disc receiving section 28, so that the two-layer section 14 is formed so as to extend out-ward from a position of a partition of the disc receiving section 28.

The disc-like medium 10 may be constructed so as to carry out magneto-optical recording and reproducing and has a clamping plate 20 of a magnetic material such as stainless steel SUS 430 according to JIS or the like fixed thereon. The disc-like medium 10 is received in the disc receiving section 28 defined in the interior of the casing consisting of the upper casing member 1 and lower casing member 2. In the illustrated embodiment, the opening 3 described above is formed at each of the upper casing member 1 and lower casing member 2, so that a magnetic head of a recording and reproducing unit is inserted through the opening 3 of the upper casing member 1 into the casing and an optical pickup element thereof is inserted through the opening 3 of the lower casing member 2 thereinto. The lower casing member 2 is formed with a drive shaft insertion hole 21 through which a drive shaft of the unit for centering and rotating the disc-like medium 10 is inserted into the casing. The drive shaft is equipped with a magnet which functions to magnetically attract the clamping plate 20, resulting in rotating it while holding it thereon.

The shutter slide area 5 is formed on the outer surface of the casing so as to extend over the upper casing member 1 and lower casing member 2 and be recessed from the outer surface of the casing, so that the shutter 4 may be slidably fitted on the shutter slide area 5 of the casing. Also, the casing, as described above, is provided therein with the above-described shutter lock member 23 for keeping the shutter 4 from opening as desired, as well as the miserasure inhibiting member or plug 22 through which recording permission or impermission is selected as desired.

Figures 2B, 2D:
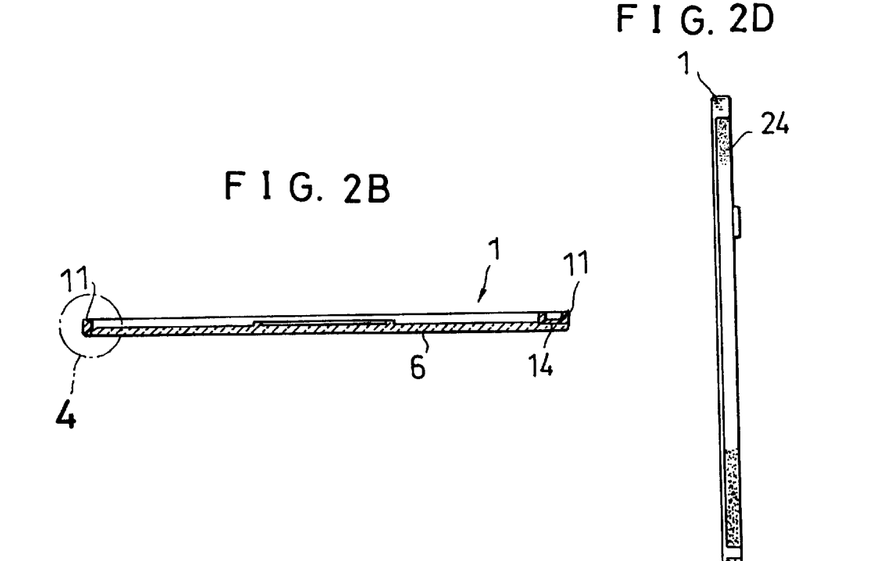
FIG. 2B is a vertical sectional view taken along line 2B—2B of FIG. 2A.
FIG. 2D is a side elevation view of the upper casing member shown in FIG. 2A.
Figure 2C:
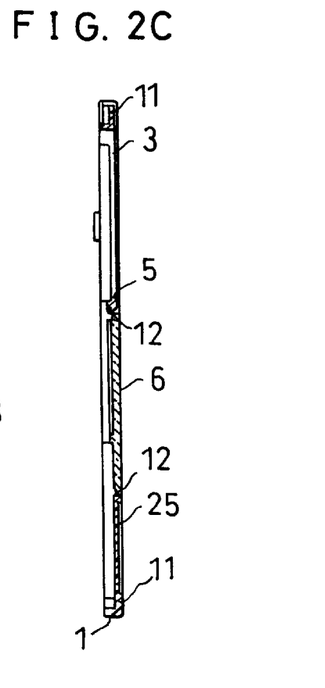
FIG. 2C is a vertical sectional view taken along line 2C—2C of FIG. 2A.

In the illustrated embodiment, the upper casing member 1, as shown in FIGS. 2 and 3, is so constructed that opposite ends thereof is constructed into the two-layer structure including the transparent resin layer and non-transparent resin layer. The upper casing member 1 may be formed at a main portion thereof other than the two-layer section 14 constructed of the transparent resin layer and non-transparent resin layer laminated on each other with a thickness of about 1 mm. The shutter slide area 5 of the upper casing member 1 may be formed with a thickness of about 0.65 mm. Also, the main portion of the upper casing member 1 is provided with a label application area 25, which is formed with a thickness of about 0.8 mm.

Also, during a molding operation, the shutter slide area 5 and transparent window 6 are provided with a gate 26 for non-transparent resin and a gate 27 for transparent resin, respectively. The gates each are preferably provided with a small recess in view of any possible occurrence of a bur.

Figure 4:
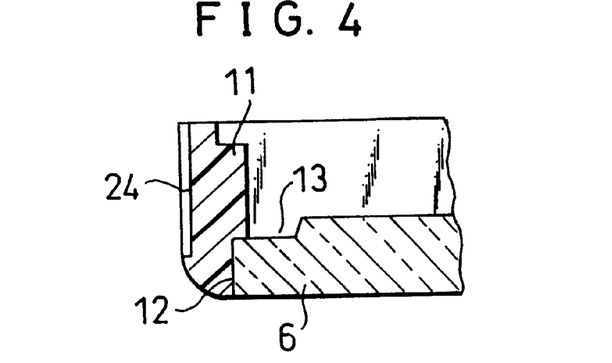
FIG. 4 is a fragmentary enlarged vertical sectional view showing a portion of the upper casing member indicated at a circle 4 in FIG. 2B.

The transparent window 6, as shown in FIG. 4, is provided at an outer periphery thereof with a level different portion 13, so that a part of a molding die for forming the portion 13 functions as a shield for preventing non-transparent resin from leaking to the transparent section during molding of the resin. The provision of the level different portion 13 also functions to prevent whole-surface contact between a slide mold 9 and a movable part 8 of the molding die, to thereby prevent damage to the mold and die. When the casing is formed on one of side surfaces or ends thereof with a label application portion 24, the two-layer structure or section may be formed so as not to extend to the side end. Thus, the side end is not formed into the two-layer structure unlike the other side end. In this instance, the transparent window 6 is constructed so as to be slightly engaged with the non-transparent resin section 11 at a joint portion 12. Such construction permits joining strength between the transparent resin section and the non-transparent resin section to be significantly increased.

Figure 5A:
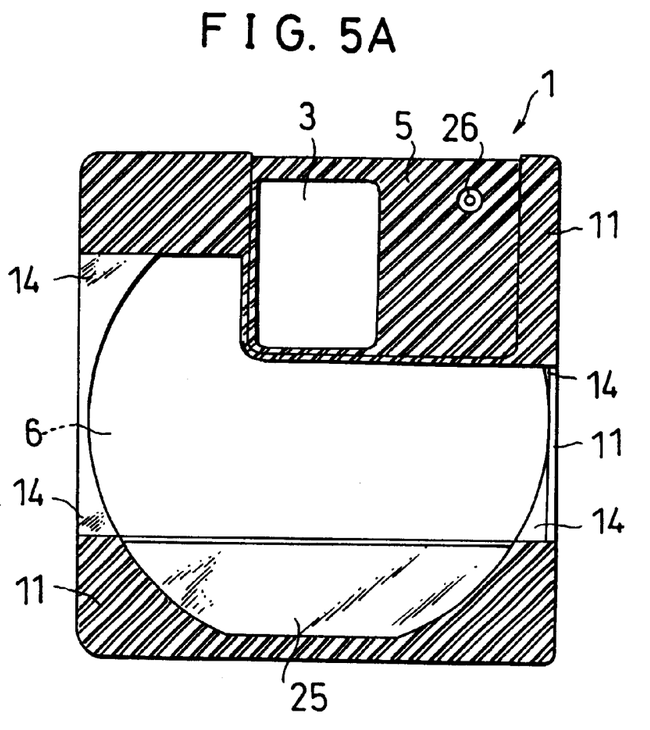
FIG. 5A is a plan view showing a non-transparent section provided at an outer periphery of the upper casing member shown in FIG. 3.
Figure 5B:
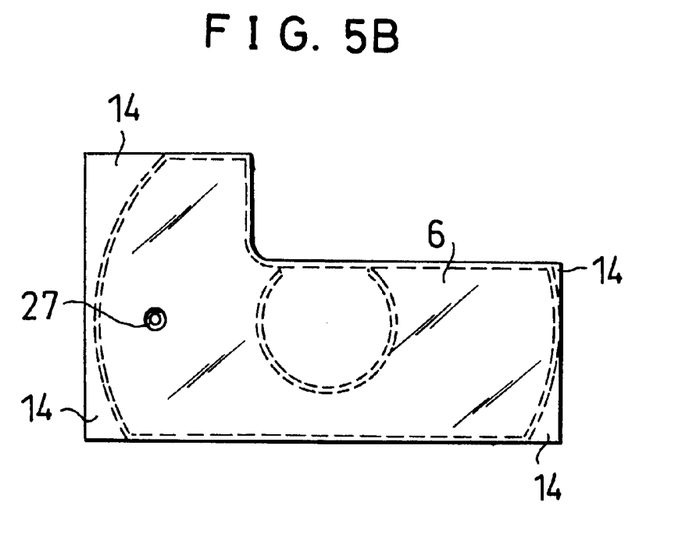
FIG. 5B is a plan view showing a transparent molded section of the upper casing member shown in FIG. 3.

In the upper casing member 1, the two-layer section 14, as shown in FIGS. 5A and 5B, may be arranged at the periphery of the disc receiving section 28 so as to separate the non-transparent resin section and transparent resin section from each other. Such arrangement permits strength of joining between the non-transparent resin and the transparent resin to be increased.

A molding die for forming the casing of the disc cartridge of the illustrated embodiment constructed as described above, as shown in FIGS. 6A and 6B, includes a fixed part 7 for integrally forming both non-transparent resin and transparent or semitransparent resin into the casing of the disc cartridge, as well as a movable part 8. A slide mold 9 for forming the transparent resin section and the transparent resin layer of the two-layer section 14 is arranged in the fixed part 7.

Figure 6A:
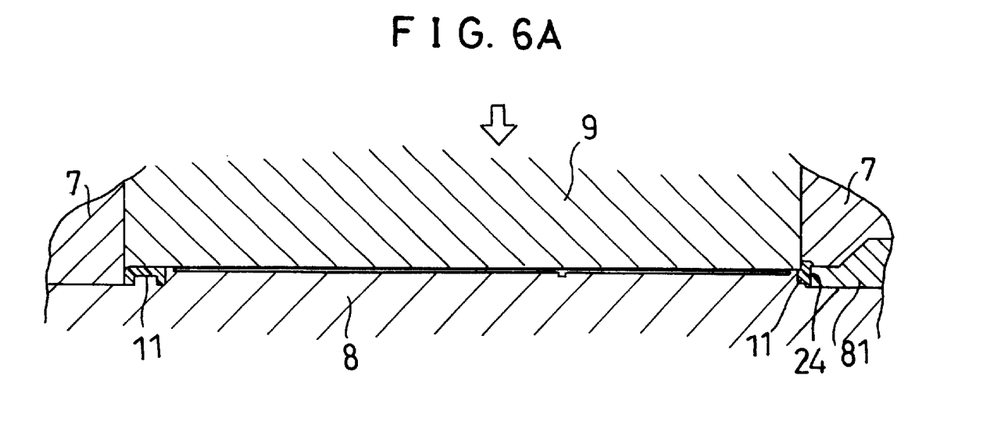
FIG. 6A is an enlarged sectional view taken along line 6—6 of FIG. 3 wherein a slide mold is advanced during operation of a molding die.
Figure 6B:
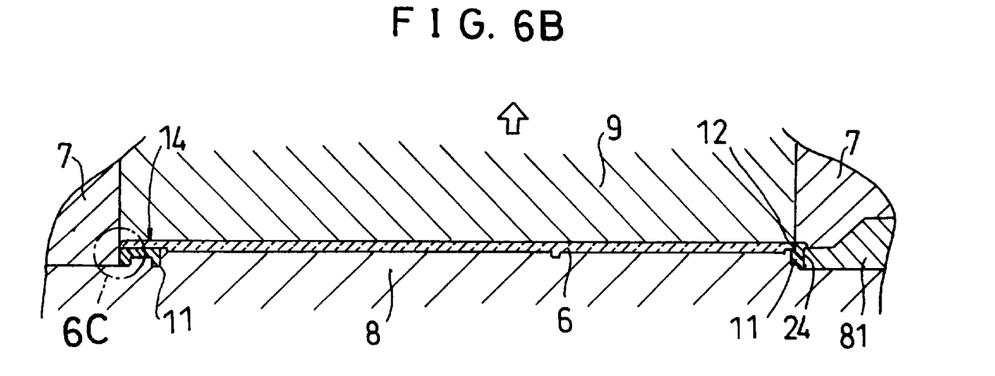
FIG. 6B is an enlarged view taken along line 6—6 of FIG. 3 wherein a slide mold is retreated during operation of a molding die.

In order to inject the non-transparent resin to be injection-molded into the molding die first, the slide mold 9 arranged in the fixed part 7 is advanced as shown in FIG. 6A. Then, in order to inject the transparent resin to be injection-molded, the slide mold 9 is retreated, resulting in molding being carried out as shown in FIG. 6B. The slide mold 9 which is arranged in the fixed part 7 of the molding die is slidably moved by means of a hydraulic cylinder or the like. Resin is substantially increased in pressure during injection-molding thereof, so that a positioning member may be provided in the molding die for stabilizing a position of advance or retreat of the slide mold 9 as required.

Figure 6C:
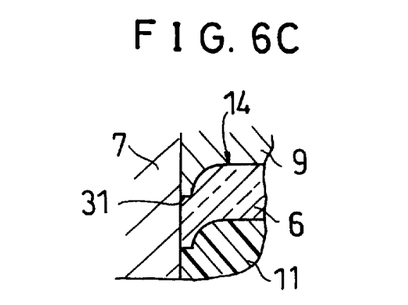
FIG. 6C is a fragmentary enlarged view detailedly showing a portion indicated at a circle 6C in FIG. 6B.

The label application portion 24 provided on the side end surface of the casing has a surface rendered rough in order to facilitate re-application of a label. Such a rough surface is formed by means of a slide core 81. The slide mold 9, as shown in FIG. 6C, may be provided at an edge portion thereof on a left-hand side thereof with a slight straight portion 31, to thereby prevent damage to the mold or die. Such construction effectively prevents a parting line of the die or mold from being formed on the disc receiving section 28 of the upper casing member 1 during molding thereof, to thereby prevent forming of any bur on the casing, resulting in ensuring safety of the disc-like medium.

In the illustrated embodiment, the shutter slide area 5 is made of non-transparent resin. Such formation of the shutter slide area 5 reduces an area of the transparent resin section, to thereby cause a portion of the disc-like medium received in the casing which is externally observed to be decreased in area. However, this permits the molding die to be advantageously simplified in structure.

The above description on the illustrated embodiment has been made on the upper casing member 1, however, the lower casing member 2 may be likewise constructed in substantially the same manner as the upper casing member 1.

Figure 7A:
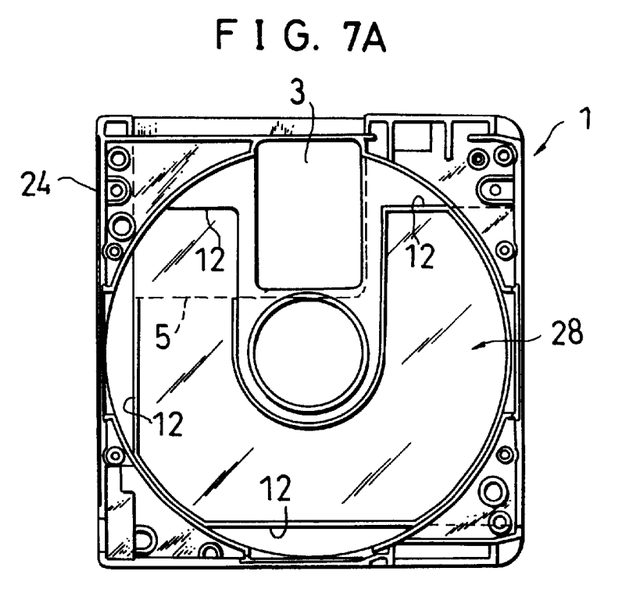
FIG. 7A is a bottom view showing an inner structure of an upper casing member of a casing incorporated in another embodiment of a disc cartridge according to the present invention.
Figure 7B:
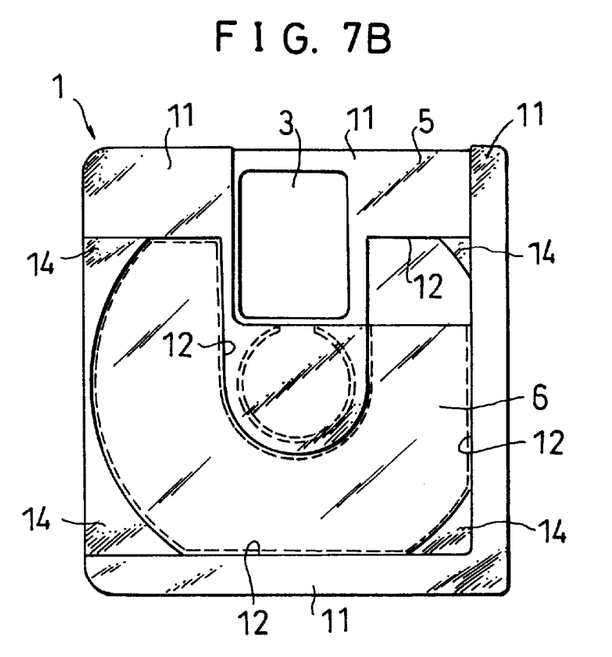
FIG. 7B is a plan view showing an outer structure of the upper casing member of FIG. 7A.

Referring now to FIGS. 7A and 7B, another embodiment of a disc cartridge according to the present invention is illustrated. A disc cartridge of the illustrated embodiment is so constructed that a shutter slide area or portion 5 is provided with a two-layer section 14 including a transparent resin layer and a non-transparent resin layer as well. For this purpose, two slide molds are arranged, so that one slide mold for forming a main portion of a casing is rendered different in the amount of sliding movement from the other slide mold for forming the shutter slide portion. Such arrangement of the slide molds permits the shutter slide area inherently decreased in thickness to be constructed into a two-layer structure using a portion of the casing outside a disc receiving section, resulting in joining strength between the resins being increased.

As can be seen from the foregoing, the disc cartridge of the present invention is so constructed that the casing is provided at the peripheral portion thereof other than the disc receiving section opposite to the disc-like medium with the two-layer section constructed of the non-transparent resin layer and transparent or semitransparent resin layer laminated on each other in the direction of thickness of the casing. Such construction permits the joint between the non-transparent resin section and the transparent or semi-transparent resin section to be arranged so as to extend not only in a direction of thickness of the cartridge but in a horizontal or lateral direction thereof at an intermediate thereof in the thickness direction, so that an area of the joint may be extensively increased, resulting in joining strength being increased. This permits molding of the casing to be accomplished at substantially the same resin temperature and die temperature as in molding with single resin while preventing a failure in molding. Also, it improves an appearance of the disc cartridge due to a combination of the three different sections or the non-transparent section, transparent section and two-layer section.

Further, the molding die of the present invention is so constructed that the slide mold for molding the transparent resin section and the transparent resin layer of the two-layer section is arranged on the fixed part. Such construction permits the movable part of the molding die to be constructed in substantially the same manner as a conventional die using single resin, so that the movable part may be simplified in structure. Also, it keeps the movable part of the molding die for forming the inside portion of the casing from being formed with a parting line, so that the inner surface of the casing is free from any bur, resulting in reliability and safety of the disc cartridge being ensured for a long period of time. Further, the molding die of the present invention significantly reduces a manufacturing cost of the casing and facilitates production thereof.

While preferred embodiments of the present invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:
   a casing of substantially rectangular shape formed with at least one opening through which a drive and/or operation element of a recording and reproducing unit is withdrawably inserted into said casing;
   said casing including integrally molded non-transparent resin sections and transparent or semi-transparent resin sections;
   said casing being formed therein with a disc receiving section in which a disc-shaped medium is rotatably received;
   said casing being provided at a peripheral area outside said disc receiving section with an integrally molded two-layer section including a non-transparent resin layer and a transparent or semi-transparent resin layer, said layers being laminated on each other in a direction of thickness of said casing.

2. A disc cartridge as defined in claim 1, wherein said disc receiving section of said casing has a transparent window formed of transparent or semitransparent resin;
   said transparent window being formed so as to be contiguous to said two-layer section.

3. A disc cartridge as defined in claim 2, wherein said disc receiving section is formed without leaving a parting line of a casing molding die on a surface thereof which faces said disc-shaped medium.

4. A disc cartridge as defined in claim 3, wherein said non-transparent resin layer of said two-layer section is arranged on a side of an inner surface of said casing and said transparent or semitransparent resin layer thereof is arranged on a side of an outer surface of said casing.

5. A disc cartridge as defined in claim 2, wherein said non-transparent resin layer of said two-layer section is arranged on a side of an inner surface of said casing and said transparent or semitransparent resin layer thereof is arranged on a side of an outer surface of said casing.

6. A disc cartridge as defined in claim 2, further comprising a shutter slidably fitted on said casing so as to open and close a second opening, through which a head of a recording or reproducing unit is withdrawably inserted, wherein said casing is formed on an outer surface thereof with a shutter slide area which is recessed from a level of said outer surface thereof, on which shutter slide area said shutter is slidably fitted, and said shutter slide area including a part of said two-layer section.

7. A disc cartridge as defined in claim 2, wherein a thickness of said transparent layer of said two-layer section is less than a thickness of said transparent window.

8. A disc cartridge as defined in claim 1, wherein said disc receiving section is formed without leaving a parting line of a casing molding die on a surface thereof which faces said disc-shaped medium.

9. A disc cartridge as defined in claim 8, wherein said non-transparent resin layer of said two-layer section is arranged on a side of an inner surface of said casing and said transparent or semitransparent resin layer thereof is arranged on a side of an outer surface of said casing.

10. A disc cartridge as defined in claim 1, wherein said non-transparent resin layer of said two-layer section is arranged on a side of an inner surface of said casing and said transparent or semitransparent resin layer thereof is arranged on a side of an outer surface of said casing.

11. A disc cartridge as defined in claim 1, further comprising a shutter slidably fitted on said casing so as to open and close a second opening through which a head of a recording or reproducing unit is withdrawably inserted, wherein said casing is formed on an outer surface thereof with a shutter slide area which is recessed from a level of said outer surface thereof, on which shutter slide area said shutter is slidably fitted, and said shutter slide area including a part of said two-layer section.

12. A disc cartridge as defined in claim 1, wherein said two-layer section outside said disc receiving section comprises right-angled corner portions.

13. A disc cartridge comprising:
   a casing of substantially rectangular shape formed with a least one opening through which a drive and/or operation element of a recording and reproducing unit is withdrawably inserted into said casing;
   said casing including integrally molded non-transparent resin sections and transparent or semi-transparent resin sections;
   said casing being formed therein with a disc receiving section in which a disc-shaped medium is rotatably received, said disc receiving section of said casing having a transparent window formed of transparent or semi-transparent resin;
   said casing being provided at a peripheral area outside said disc receiving section with an integrally molded two-layer section including a non-transparent resin layer and a transparent or semi-transparent resin layer, said layers being laminated on each other in a direction of thickness of said casing; and said transparent window including a peripheral edge that is butt-jointed to a non-transparent resin section of said casing.

14. A disc cartridge as defined in claim 13, wherein said transparent window is provided at a second outer peripheral edge with a level different portion adjacent to said second outer peripheral edge thereof.

15. A disc cartridge as defined in claim 14, wherein said two-layer section has an interface level at an interface between said transparent resin layer and said non-transparent layer; said level different portion of said transparent window being at a same level as said interface level.

16. A disc cartridge as defined in claim 14, wherein a thickness of said transparent layer of said two-layer section is less than a thickness of said transparent window outside said level different portion.

17. A disc cartridge as defined in claim 14, wherein a thickness of said transparent layer of said two-layer section is substantially the same as a thickness of said level different portion of said transparent window.

18. The disc cartridge of claim 13, wherein said disc receiving section is formed without leaving a parting line of a casing molding die thereon.

19. The disc cartridge of claim 13, wherein said non-transparent resin layer of said two-layer section is arranged on a side of an inner surface of said casing and said transparent or semi-transparent resin layer thereof is arranged on a side of an outer surface of said casing.

20. The disc cartridge of claim 13, further comprising a shutter slidably fitted on said casing so as to open and close a second opening through which a head of a recording or reproducing unit is withdrawably inserted, wherein said casing is formed on an outer surface thereof with a shutter slide area which is recessed from a level of said outer surface thereof, on which shutter slide area said shutter is slidably fitted, and said shutter slide area including a part of said two-layer section.

21. The disc cartridge of claim 13, wherein said disc receiving section of said casing has a transparent window formed of transparent or semi-transparent resin, and a thickness of said transparent layer of said two-layer section is less than a thickness of said transparent window.

22. The disc cartridge of claim 13, wherein said two-layer section outside said disc receiving section comprises right-angled corner portions.

23. A disc cartridge comprising:

a casing of a substantially rectangular shape formed with at least a first opening through which a drive and/or operation element of a recording and reproducing unit is withdrawably inserted into said casing, said casing being integrally molded of non-transparent resin and transparent resin;

a disc medium rotatably received in said casing; and a shutter for selectively closing a second opening through which a head of a recording or reproducing unit is withdrawably inserted;

said casing being formed therein with a disc receiving section in which said disc medium is rotatably received;

said casing including integrally molded non-transparent resin sections with a central area thereof having transparent sections formed of transparent resin, said casing being provided at a peripheral area outside said disc receiving section with a two-layer section constructed of a non-transparent resin layer and a transparent resin layer laminated on each other in a direction of thickness of said casing.

24. A disc cartridge as defined in claim 23, wherein said disc receiving section of said casing extends from said transparent section to a non-transparent resin section of said casing formed of non-transparent resin.

25. A disc cartridge as defined in claim 24, wherein said non-transparent resin layer of said two-layer section is arranged on an inner surface side of said casing and said transparent resin layer thereof is arranged on an outer surface side of said casing.

26. A disc cartridge as defined in claim 23, wherein said non-transparent resin layer of said two-layer section is arranged on an inner surface side of said casing and said transparent resin layer thereof is arranged on an outer surface side of said casing.

27. A disc cartridge as defined in claim 23, wherein said disc receiving section of said casing has a transparent window formed of transparent or semi-transparent resin and a thickness of said transparent layer of said two-layer section is less than a thickness of said transparent window outside said level different portion.

28. A disc cartridge as defined in claim 23, wherein said two-layer section outside said disc receiving section comprises right-angled corner portions.

29. A disc cartridge comprising:

a casing of a substantially rectangular shape formed with a first opening through which a head of a recording and reproducing unit is withdrawably inserted into said casing, said casing including an upper casing member and a lower casing member joined to each other, said upper casing member being integrally molded of non-transparent resin and transparent or semi-transparent resin;

a disc medium rotatably received in said casing;

a shutter for selectively closing said first opening;

said casing being formed therein with a disc receiving section in which said disc medium is rotatably received and which has a substantially circular outer periphery;

said upper casing member of said casing including a non-transparent section formed of non-transparent resin and provided at a central area thereof with a transparent window formed of transparent or semi-transparent resin, said transparent window having an outer configuration including a portion which extends along said substantially circular outer periphery of said disc receiving section, wherein said transparent window includes a peripheral edge other than a part thereof positioned in said two-layer section that is provided with a level different portion adjacent to said peripheral edge thereof, said peripheral edge being butt-jointed to said non-transparent section of said upper casing member;

said upper casing member of said casing being provided at a peripheral area outside said outer periphery of said disc receiving section with a two-layer section including a non-transparent resin layer and a transparent or semi-transparent resin layer laminated on each other in a direction of thickness of said upper casing member; and a thickness of said transparent layer of said two-layer section being less than a thickness of said transparent window.

30. A disc cartridge as defined in claim 29, wherein said transparent window is formed so as to be contiguous to said two-layer section.

31. A disc cartridge as defined in claim 29, wherein a thickness of said transparent layer of said two-layer section is substantially the same as a thickness of said level different portion of said transparent window.

32. A disc cartridge comprising:

a casing of substantially rectangular shape formed with at least one opening through which a drive and/or operation element of a recording and reproducing unit may be withdrawably inserted into said casing;

said casing including a first casing member and a second casing member that are joined together, one of said casing members including integrally molded non-transparent resin sections and transparent or semi-transparent resin sections;

said casing being formed therein with a disc receiving section in which a disc medium is rotatably received; and said one of said casing members being provided at a peripheral area outside said disc receiving section with an integrally molded two-layer section including a non-transparent resin layer and a transparent or semi-transparent resin layer, said layers being laminated on each other in a direction of thickness of said casing.

33. A disc cartridge as defined in claim 32, wherein said one of said casing members includes a main portion therefor which extends over said disc receiving section; and said main portion includes a first part formed of the non-transparent resin and a second part formed of the transparent or semi-transparent resin, both parts having substantially the same thickness.

34. A disc cartridge as defined in claim 33, wherein said second part of said main portion formed of the transparent or semi-transparent resin includes a peripheral edge that is butt-joined to said first part of said main portion formed of the non-transparent resin other than a part of said peripheral edge which is contiguous to said two-layer section.

35. A disc cartridge as defined in claim 34, wherein said part of said main portion formed of the transparent or semi-transparent resin is provided at an outer periphery thereof with a level different portion adjacent to said peripheral edge thereof.

36. A disc cartridge as defined in claim 34, wherein said transparent or semi-transparent resin layer has a reduced thickness as compared with that of said second part of said main portion formed of the transparent or semi-transparent resin.

* * * * *

UNITED STATES PATENT AND TRADEMARK OFFICE
CERTIFICATE OF CORRECTION

PATENT NO.   : 6,266,319 B1
DATED        : July 24, 2001
INVENTOR(S)  : Masaru Ikebe, Yukio Miyazaki and Akio Momoi It is certified that error appears in the above-identified patent and that said Letters Patent is hereby corrected as shown below:

Column 4,
Line 40, change "burr" to -- bur --.
Line 63, change "out-ward" to -- outward --.

Column 5,
Line 30, change "is" to -- are --.

Column 8,
Line 52, change "a" to (second occurrence) to -- at --.

Column 12,
Line 2, change "therefor" to -- thereof --.

Signed and Sealed this

Sixteenth Day of April, 2002

Attest:

JAMES E. ROGAN
Attesting Officer        Director of the United States Patent and Trademark Office